(12) United States Patent
Campisano et al.

(10) Patent No.: US 8,014,651 B2
(45) Date of Patent: Sep. 6, 2011

(54) MPEG-2 DECODER, METHOD AND BUFFER SCHEME FOR PROVIDING ENHANCED TRICK MODE PLAYBACK OF A VIDEO STREAM

(75) Inventors: Francesco A. Campisano, Austin, TX (US); Dennis P. Cheney, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1139 days.

(21) Appl. No.: 10/607,529

(22) Filed: Jun. 26, 2003

(65) Prior Publication Data

US 2004/0264924 A1 Dec. 30, 2004

(51) Int. Cl.
*H04N 5/783* (2006.01)
(52) U.S. Cl. ........ 386/343; 386/345; 386/346; 386/347; 386/348; 386/349; 386/350; 386/351
(58) Field of Classification Search .................. 386/6–8, 386/68, 70, 33, 111–112, 27, 29, 64, 95, 386/98, 131, 36, 343, 345, 346, 347, 348, 386/350, 349, 351
See application file for complete search history.

(56) References Cited

U.S. PATENT DOCUMENTS

| | | | |
|---|---|---|---|
| 5,453,790 A | 9/1995 | Vermeulen et al. | |
| 5,588,029 A | 12/1996 | Maturi et al. | |
| 5,729,648 A | 3/1998 | Boyce et al. | |
| 5,960,006 A | 9/1999 | Maturi et al. | |
| 5,974,224 A * | 10/1999 | Nagata ........................... | 386/109 |
| 6,014,706 A | 1/2000 | Cannon et al. | |
| 6,118,921 A | 9/2000 | Kim | |
| 6,141,486 A | 10/2000 | Lane et al. | |
| 6,154,603 A | 11/2000 | Willis et al. | |
| 6,233,389 B1 | 5/2001 | Barton et al. | |
| 6,466,733 B1 * | 10/2002 | Kim ................................ | 386/68 |
| 6,473,558 B1 * | 10/2002 | Wu et al. ........................ | 386/68 |
| 6,557,139 B2 * | 4/2003 | Bohnke ......................... | 714/758 |
| 7,062,149 B2 * | 6/2006 | Seki et al. ...................... | 386/68 |
| 2001/0006576 A1 | 7/2001 | Kagawa et al. | |
| 2002/0034374 A1 | 3/2002 | Barton | |
| 2002/0051621 A1 | 5/2002 | Cuccia | |
| 2002/0061183 A1 | 5/2002 | MacInnis | |
| 2002/0136530 A1 | 9/2002 | Pietraszak | |

FOREIGN PATENT DOCUMENTS

JP 5344494 A 12/1993

* cited by examiner

*Primary Examiner* — Thai Tran
*Assistant Examiner* — Daquan Zhao
(74) *Attorney, Agent, or Firm* — Ian MacKinnon; Hoffman Warnick LLC

(57) ABSTRACT

Trick mode playback is implemented by disengaging a frame synchronization signal, and then decoding "I" and "P" frames to two (or more) buffers. Specifically, each buffer has a pointer that is associated with a memory/origin address. The pointers are locked in place by disengaging the frame synchronization signal. Once the pointers are locked in place, the "I" frames and "P" frames are decoded to the two buffers in an alternating fashion based on a continuous swapping of the memory addresses associated with the two pointers. Because both "I" and "P" frames (as opposed to only "I" frames) are decoded and displayed, the trick mode playback appears smoother. In addition, because the frame synchronization signal was disengaged, the frames can be decoded at a rate faster than a single frame time. That is, one frame need not be completely decoded and read out before the next frame is decoded.

21 Claims, 7 Drawing Sheets

MPEG-2 DECODER, METHOD AND BUFFER SCHEME FOR PROVIDING ENHANCED TRICK MODE PLAYBACK OF A VIDEO STREAM

BACKGROUND OF THE INVENTION

1. Field of the Invention

In general, the present invention provides a MPEG-2 decoder, method and buffer scheme for providing enhanced trick mode playback of a video stream. Specifically, the present invention utilizes at least two memory buffers to decode I frames and P frames at a rate faster than a single frame time to provide the enhanced fast forward playback (or rewind) of the video stream.

2. Related Art

The Moving Picture Experts' Group (MPEG) MPEG-2 standard is a well known compression/decompression standard for video applications. In general, this standard describes an encoded and compressed data stream that has substantial bandwidth reduction. The compression of the data stream is a subjective loss compression followed by a lossless compression. The encoded, compressed digital video data is subsequently decompressed and decoded in an MPEG-2 Standard compliant decoder. To this extent, the MPEG-2 Standard further is described in, e.g., C. A. Gonzales and E. Viscito, "Motion Video Adaptive Quantization In The Transform Domain," IEEE Trans. Circuits System Video Technology, Volume 1, No. 4, December 1991, pp. 374-378, E. Viscito and C. A. Gonzales, "Encoding of Motion Video Sequences for the MPEG Environment Using Arithmetic Coding," SPIE, Vol. 1360, pp. 1572-1576, (1990), D. LeGall, "MPEG: A Video Compression Standard for Multimedia Applications," Communications of the ACM, Vol. 34, No. 4, (April 1991), pp. 46-58, S. Purcell and D. Galbi, "C Cube MPEG Video Processor," SPIE, v. 1659, (1992) pp. 24-29, and D. J. LeGall, "MPEG Video Compression Algorithm," Signal Process Image Commun., v. 4, n. 2, (1992), pp. 129-140, among others.

Under the MPEG-2 standard, temporal redundancy reduction is provided through the use of various predictive and interpolative tools. Typically, three types of frames or pictures, "I" Intrapictures, "P" Predicted Pictures, and "B" Bidirectional Interpolated Pictures are provided. Motion compensation goes to the redundancy between pictures. The formation of "P" frames from "I" frames, and of "B" frames from a pair of past and future pictures is a key feature of the MPEG-2 Standard technique. Specifically, the "I" frames provide moderate compression, and are access points for random access of the stream (e.g., in the case of video tapes or CD ROMS). As a matter of convenience, one "I" frame can be provided at varying intervals (e.g., every half second or every ten to twenty pictures). The "I" frame only gets information from itself and does not receive information from an "P" frame or "B" frame. Thus, scene cuts preferably occur at "I" frames. "P" frames are coded with respect to a previous frame and are used as the reference for future frames, both "P" and "B" frames. Still yet, "B" frames have the highest degree of compression. However, they require both a past picture and a future frame for reconstruction and are never used as a reference.

In general, the decode engine of an MPEG-2 decoder is designed to operate in a minimal amount of memory, typically using two megabytes of memory for a main profile level MPEG-2 video stream. This is accomplished using a three buffer scheme, in which two frame buffers are used to collect the uncompressed reference frames ("I" and "P" frames), while a third buffer is used to collect the uncompressed bi-directional ("B") frame. The reference frame buffers are decoded in their entirety prior to a display process that reads out the contents of the buffers in raster scan order. Conversely, the "B" frame buffer is shared simultaneously between the display process and the decode process. The minimum amount of memory usage is established by how efficiently the decoder can manage the overlap of data in the "B" frame buffer to accomplish the concurrent decode/display functions in one memory space. One such method is shown and described in U.S. Pat. No. 5,668,599, which is herein incorporated by reference.

For normal playback, memory management generally requires that the decoding of the individual frames be paced according to the rate at which they are displayed, otherwise more memory will be required to buffer additional frames or portions of video frames. To this extent, a frame synchronization signal is used to mark the start of another frame or field interval to establish a point in time for continuing with the next frame to decode. The synchronization signal is also used to establish whether there should be any adjustments to the video decoding to compensate for falling behind or ahead of the presentation time stamp.

Although extremely popular and useful, the MPEG-2 standard fails to provide an optimal method for trick mode playback (e.g., fast forward or rewind playback). For example, in the case of a DVD, if a user selects to fast forward (scan) a movie, a great amount of discontinuity and distortion will be present. Such noise is often significantly greater than the user would observe when fast forwarding for example, a VHS movie. In many instances, a great amount of motion discontinuity will be present. Such discontinuity is often significantly more objectionable then the user would observe when fast forwarding for example, a VHS movie. In general, the discontinuity is caused by the fact that a typical MPEG-2 implementation will only decode "I" frames to a single buffer during fast forward playback. Accordingly, only a small amount of the video data is decoded and displayed. In addition, since the frequency at which an "I" frame exists within a group of pictures (GOP) can vary from video source to video source, no consistency in fast forward playback is provided. Still yet, because the decoding operation is paced by a frame synchronization signal, the rate at which decoding and display can occur is limited to a single frame time (e.g., 33 milliseconds) or greater. Even if an implementation were to decode both "I" and "P" frames to multiple buffers, the decoding and display operations would still be limited by the frame synchronization signal.

In view of the foregoing, there exists a need for an MPEG-2 decoder, method and buffer scheme for providing enhanced trick (e.g., fast forward, rewind, etc.) playback of a video stream. To this extent, a need exists for an implementation that provides smoother trick mode playback as well as increased decoding speed.

SUMMARY OF THE INVENTION

In general, the present invention provides an MPEG-2 decoder, method and buffer scheme for providing enchanted trick mode (e.g., fast forward, rewind, etc.) playback of a video stream. Specifically, under the present invention, enhanced trick mode playback is enabled by disengaging a frame synchronization signal, and then decoding "I" and "P" frames to two (or more) buffers. Specifically, each buffer has a pointer that is associated with a memory/origin address. The pointers are locked in place by disengaging the frame synchronization signal. Once the pointers are locked in place, the "I" frames and "P" frames are decoded to the two buffers in an alternating fashion based on a continuous swapping of the memory addresses associated with the two pointers. Because both "I" and "P" frames (as opposed to only "I" frames) are decoded and displayed, the trick mode playback appears smoother. In addition, because the frame synchronization signal was disengaged, the frames can be decoded at a rate faster than a single frame time. That is, one frame need not be completely decoded and read out before the next frame is decoded.

A first aspect of the present invention provides an MPEG-2 video decoding method for providing enhanced trick mode playback of a video stream, comprising: providing a first buffer and a second buffer within an MPEG-2 decoder, wherein the first buffer has a first pointer that is associated with a first address, and wherein the second buffer has a second pointer that is associated with a second address; locking the first pointer and the second pointer in place by disengaging a frame synchronization signal within the MPEG-2 decoder; and decoding a set of frames of the video stream to the first buffer and the second buffer in an alternating fashion by continuously swapping the first address and the second address.

A second aspect of the present invention provides an MPEG-2 decoder for providing enhanced trick mode playback of a video stream, comprising: a first buffer and a second buffer, wherein the first buffer has a first pointer that is associated with a first address, and wherein the second buffer has a second pointer that is associated with a second address; and microcode for locking first pointer and the second pointer in place by disengaging a frame synchronization signal within the MPEG-2 decoder, and for continuously swapping the first address and the second address so that a set of frames of the video stream comprising at least one I frame and at least zero P frames can be decoded to the first buffer and the second buffer in an alternating fashion.

A third aspect of the present invention provides an MPEG-2 buffer scheme for providing enhanced trick mode playback of a video stream, comprising: a first buffer having a first pointer that is associated with a first address; and a second buffer having a second pointer that is associated with a second address, wherein the first pointer is locked to the first buffer and the second pointer is locked to the second buffer, and wherein a set of frames of the video stream comprising at least one I frame and at least zero P frames is decoded to the first buffer and the second buffer in an alternating fashion based on a continuous swapping of the first address and the second address.

Therefore, the present invention provides an MPEG-2 decoder, method, and buffer scheme for providing enhanced trick mode playback of a video stream.

BRIEF DESCRIPTION OF THE DRAWINGS

These and other features of this invention will be more readily understood from the following detailed description of the various aspects of the invention taken in conjunction with the accompanying drawings in which.

Figure 1:
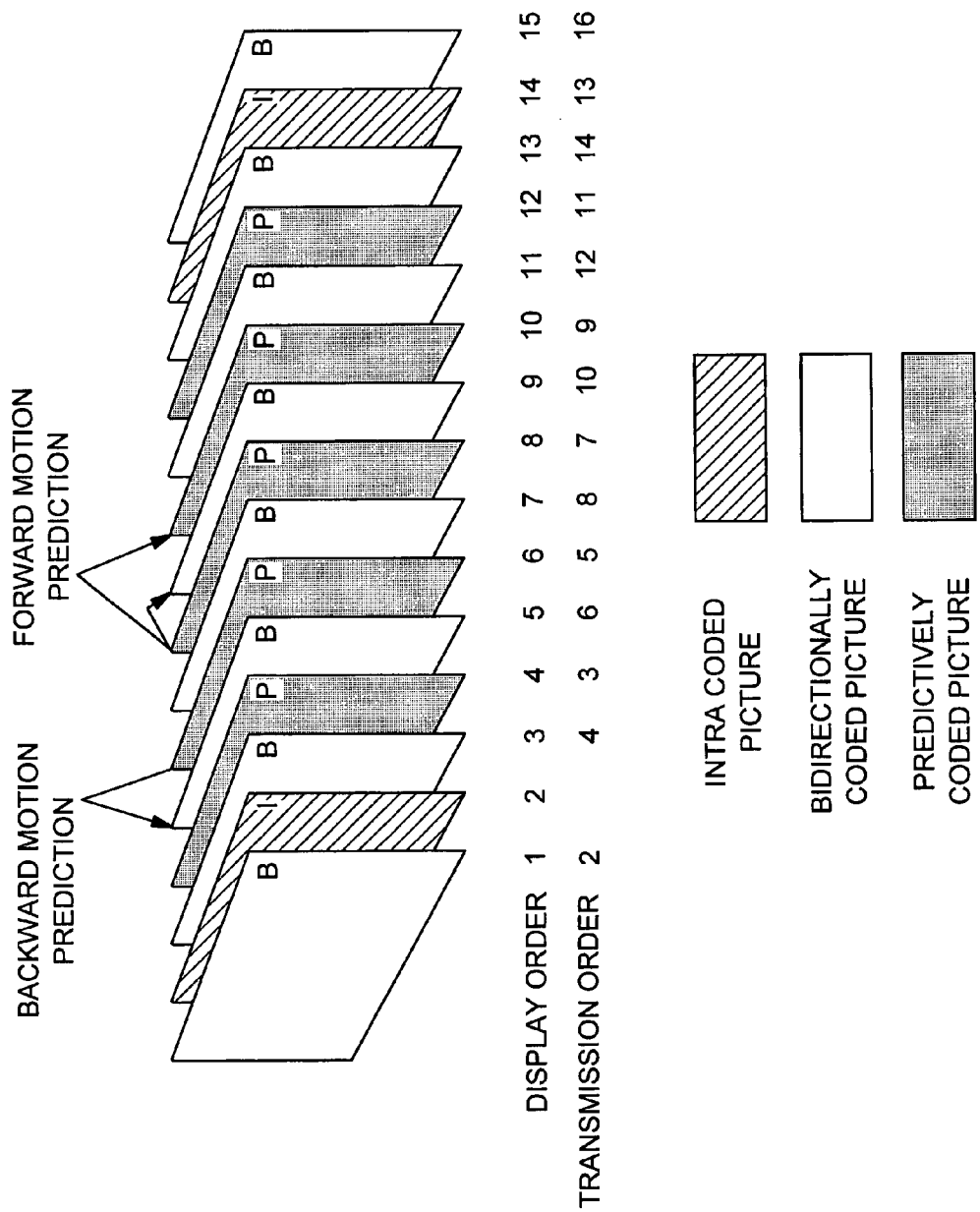
FIG. 1 shows a group of picture (GOP) and their relationship under the MPEG-2 standard.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides an MPEG-2 decoder, method and buffer scheme for providing enchanted trick mode (e.g., fast forward, rewind, etc.) playback of a video stream. Specifically, under the present invention, enhanced trick mode playback is enabled by disengaging a frame synchronization signal, and then decoding "I" and "P" frames to two (or more) buffers. Specifically, each buffer has a pointer that is associated with a memory/origin address. The pointers are locked in place by disengaging the frame synchronization signal. Once the pointers are locked in place, the "I" frames and "P" frames are decoded to the two buffers in an alternating fashion based on a continuous swapping of the memory addresses associated with the two pointers. Because both "I" and "P" frames (as opposed to only "I" frames) are decoded and displayed, the trick mode playback appears smoother. In addition, because the frame synchronization signal was disengaged, the frames can be decoded at a rate faster than a single frame time. That is, one frame need not be completely decoded and read out before the next frame is decoded.

It should be understood in advance that throughout this disclosure, trick mode playback will be used to refer to fast forward playback of a video stream. However, it should be understood that the teachings described herein could also be used to provide enhanced rewind playback of a video stream.

Referring now to FIG. 1, a group of picture (GOP) structure of a video stream and their relationship under the MPEG-2 standard is illustrated. In general, FIG. 1 shows three types of frames or pictures, "I" frames, "P" frames, and "B" frames. As is known, picture transmission and decoding order is not necessarily the same as picture display order. In any event, as explained above, the "I" frames only get information from themselves and do not receive information from a "P" frame or "B" frame. "P" frames are coded with respect to a previous picture and are used as the reference for future pictures, both "P" and "B" pictures. "B" frames have the highest degree of compression and require both a past picture and a future picture for reconstruction. To this extent, "B" frames are never used as a reference.

Under the MPEG-2 Standard, the basic motion compensation unit is the Macroblock unit, with the MPEG-2 Standard Macroblocks being 16×16 pixels. Motion information comprises one vector for forward predicted macroblocks, one vector for backward predicted macroblocks, and two vectors for bi-directionally predicted macroblocks. The motion information associated with each macroblock is coded differentially with respect to the motion information present in the reference macroblock. To this extent, a macroblock of pixels is predicted by a translation of a macroblock of pixels from a past or future picture. The difference between the source pixels and the predicted pixels is included in the corresponding bit stream. The decoder adds a correction term to the block of predicted pixels to produce the reconstructed block.

As illustrated in FIG. 1, each macroblock of a "P" frame can be coded with respect to the closest previous "I" frame, or with respect to the closest previous "P" frame. Further, each macroblock of a "B" frame can be coded by forward prediction from the closest past "I" or "P" frame, by backward prediction from the closest future "I" or "P" frame, or bidirectionally, using both the closest past "I" or "P" frame and the closest future "I" or "P" frame. In general, full bi-directional prediction is the least noisy prediction.

Figure 2:
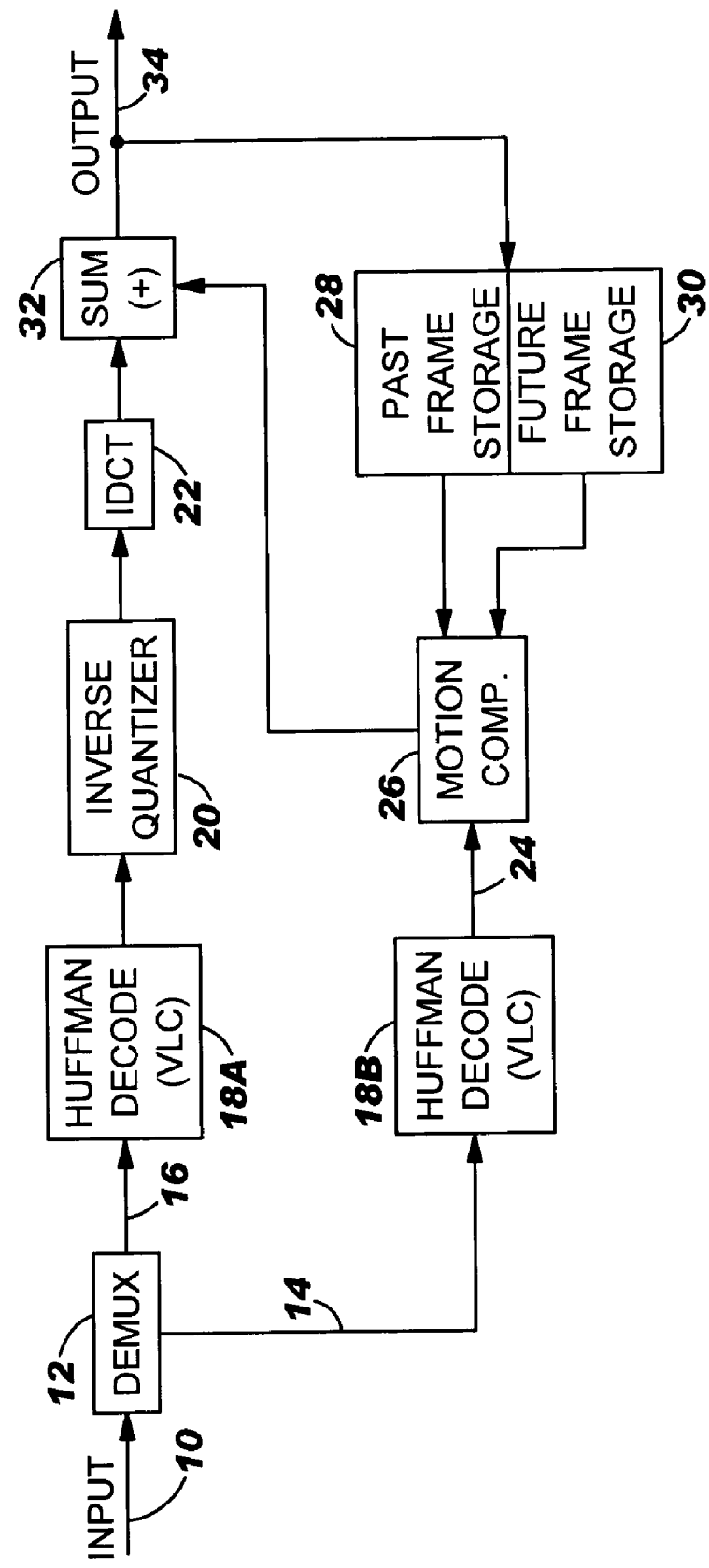
FIG. 2 depicts a logical flow diagram of the general logical flow of the MPEG-2 standard compliant decoder.

Referring now to FIG. 2, the general internal data flow of the system to support the MPEG-2 Standard is shown. Specifically, the compressed, encoded data input 10 goes to a demultiplexer 12 where it is demultiplexed into two streams 14 and 16. Stream 16 goes to a variable length code Huffman decoder (VLC) 18A for decoding, and then to an inverse quantizer 20 for dequantizing. The dequantized code then goes to an inverse discrete cosine transform (IDCT) process 22, where the dequantized code is transformed into a pixel mapping. The second data stream 14 also goes through a VLC 18B where it is decoded into motion vectors 24 that go to a motion compensator 26. VLCs 18A-B are shown as logically separate and distinct, although they may structurally and electronically be the same element. The motion compensator 26 also receives a data stream derived from the first data stream 16 and the motion compensated data stream as summed by summer 32. The output 34 of the summer 32 also goes to the pixel bus (not shown) and to storage, i.e., future frame storage 30 and past frame storage 28. The contents of the future frame storage 30 and past frame storage 28 are, as appropriate, input to the motion compensator 26.

Figure 3:
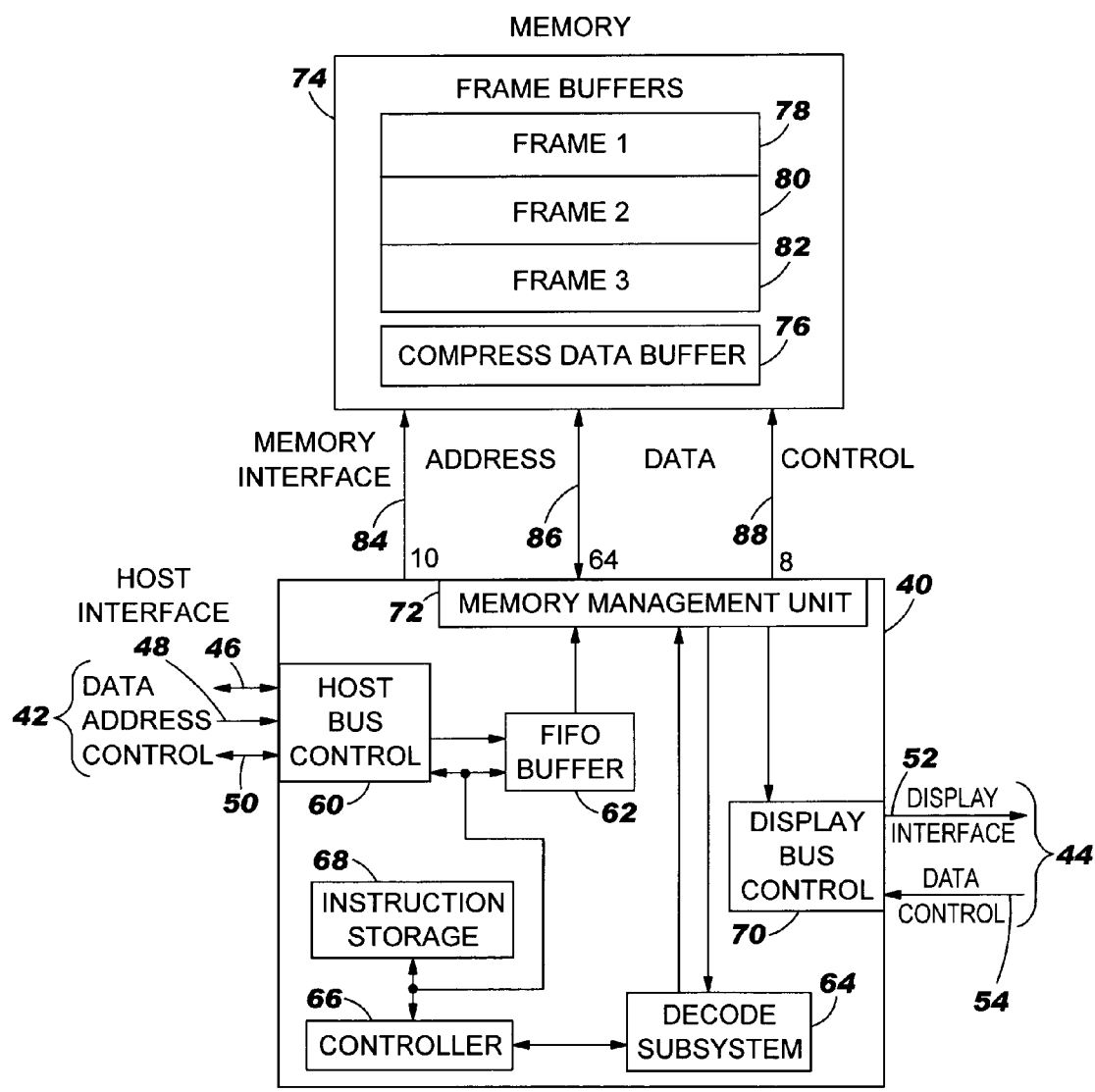
FIG. 3 depicts a block diagram of the MPEG-2 standard compliant decoder, according to the present invention.

Referring now to FIG. 3 a block diagram of a decoder system 40 according to the present invention is shown. As shown, the system I/O includes three busses from the host interface 42 and two busses to the display interface 44. The buses from host interface 42 include the data bus 46, the address bus, 48, and the control bus, 50. Data bus 46 may be a 16 bit or a 32 bit bus, or of some other width. Data bus 46 may also be serial, and it may be bi-directional or unidirectional. Address bus 48 is typically a 6 bit bus, although other widths may be accommodated without departing from the invention. Control bus 50 is typically a 7 bit bus, although other widths may be accommodated without departing from the invention. Display interface 44 busses include data bus 52 and control bus 54. Data bus 52 is for pixel data, while control bus 54 is for synchronization and control.

System 40 also includes a host bus control element 60, a FIFO buffer 62, a decode subsystem 64, a controller 66, an instruction storage unit 68, a display bus control 70, and a memory management unit 72. The memory, an external memory 74, includes a compressed data buffer 76 for receiving data from host interface 42 via the FIFO buffer 62, and frame buffers 78, 80, and 82, for receiving and storing decoded frames, including future frames and past frames. The interface between the memory management unit 72 and memory 74 includes an address bus 84, a bi-directional data bus 86, and a control bus 88.

Figure 4:
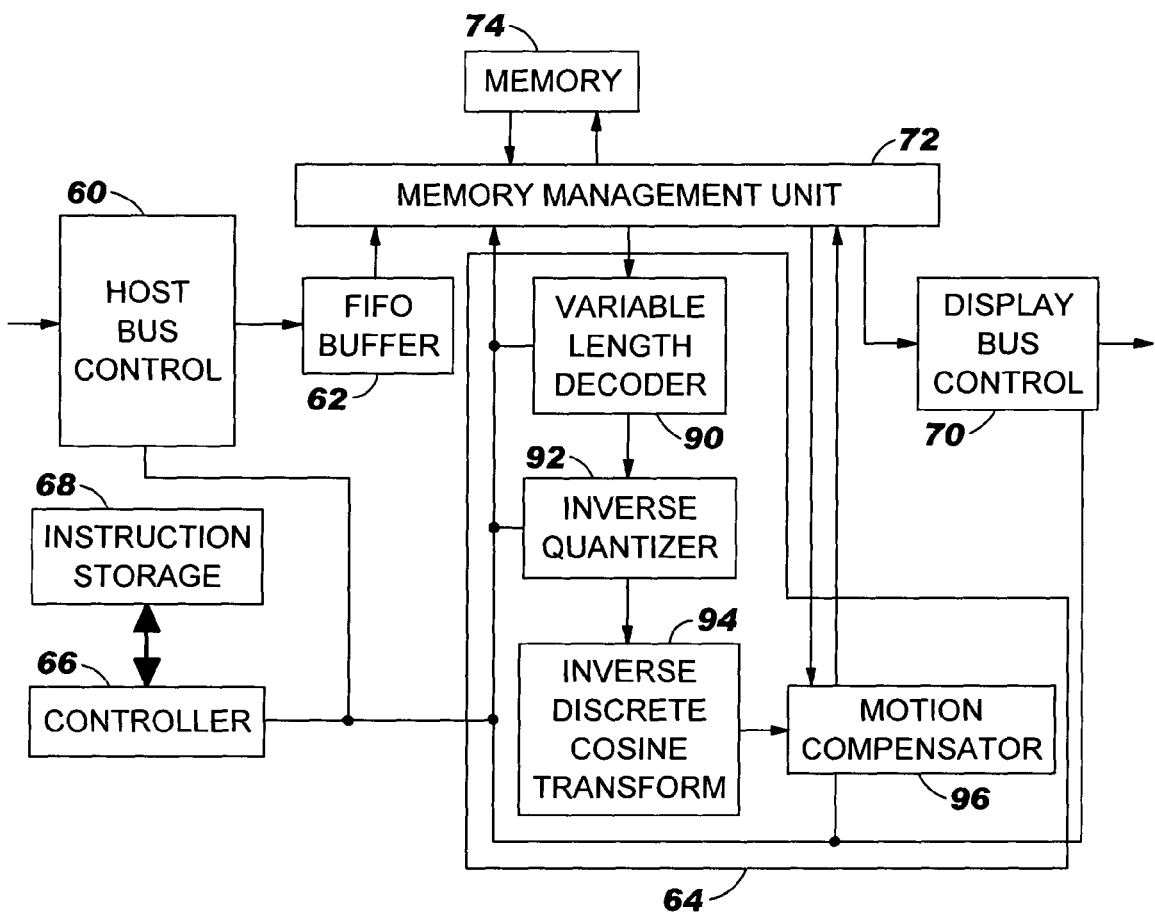
FIG. 4 depicts a block diagram of the decode subsystem of the MPEG-2 decoder of FIG. 3.

FIG. 4 shows decode subsystem 64 in greater detail. As depicted, decode subsystem 64 includes functional units that operate under the control of the controller 66 and its associated instruction storage unit 68. These functional units were functionally described in conjunction with FIG. 2 and include the variable length code huffman decoder (VLC) 90, inverse quantizer or dequantizer 92, inverse discrete cosine transform unit 94, and motion compensation unit 96. Controller 66 is coupled to VLC 90. This enables parsing of the code stream and processing of header information. VLC 90 is controlled by controller 66 as header information and block run/level symbols are passed from the compressed bit stream. A local state machine decodes the run/level symbols and interacts with inverse quantizer 92 to process the decoded signals.

It is noted that variable length coding, e.g., Huffman coding, is a statistical coding technique that assigns code words to symbols. Symbols with a high probability of occurrence are assigned short code words, while symbols with a low probability of occurrence are assigned longer code words. The codes used in the MPEG-2 VLC 90 are taken from the MPEG-2 Standard and form a class of codes known as prefix codes. In a prefix code system, no valid code is a prefix of another code. The number of bits assigned to each code word is variable, from a minimum of 1 to a maximum of 16. The coded bits used to represent a sequence of symbols are a variable length string of bits. This bit string must be decoded sequentially in order to reconstruct the original sequence of symbols. As known, Huffman coding generates code tables based on symbol occurrence probabilities. The codes generated are minimum redundancy codes. The Huffman coding used by the MPEG-2 Standard is based on a static coding algorithm. The coding procedure used by Huffman Coding is lossless coding, because the exact sequence of symbols encoded is recovered by the decoding process. Inverse quantizer 92 receives run/level (run/amplitude) coded symbols from VLC 90 and outputs a block of 64 coefficients that are sent to the inverse discrete cosine transform unit 94, which converts the run/level coded symbols to zeros and symbols, un-zigs the data, handles differential pulse code modulation (DPCM) decoding for the Discrete Cosine coefficients, and dequantizes the data.

Controller 66 is the central point of control for the decoder. To this extent, controller microcode is stored in instruction storage unit 68. Controller 66 interacts with the host system through an external processor through the host or system bus for high level commands and status. Controller 66 is responsible for the control and command of the other functional elements, as well as providing global synchronization of these units. As will be further described below, under the present invention, the controller microcode disengages the frame synchronization signal within the decoder during trick mode playback to lock pointers to specific buffers. The microcode will also continuously swap the addresses associated with the pointers. This allows "I" and "P" frames being decoded to be decoded to two or more buffers in an alternating fashion, without being limited in time by the synchronization signal.

Figure 5:
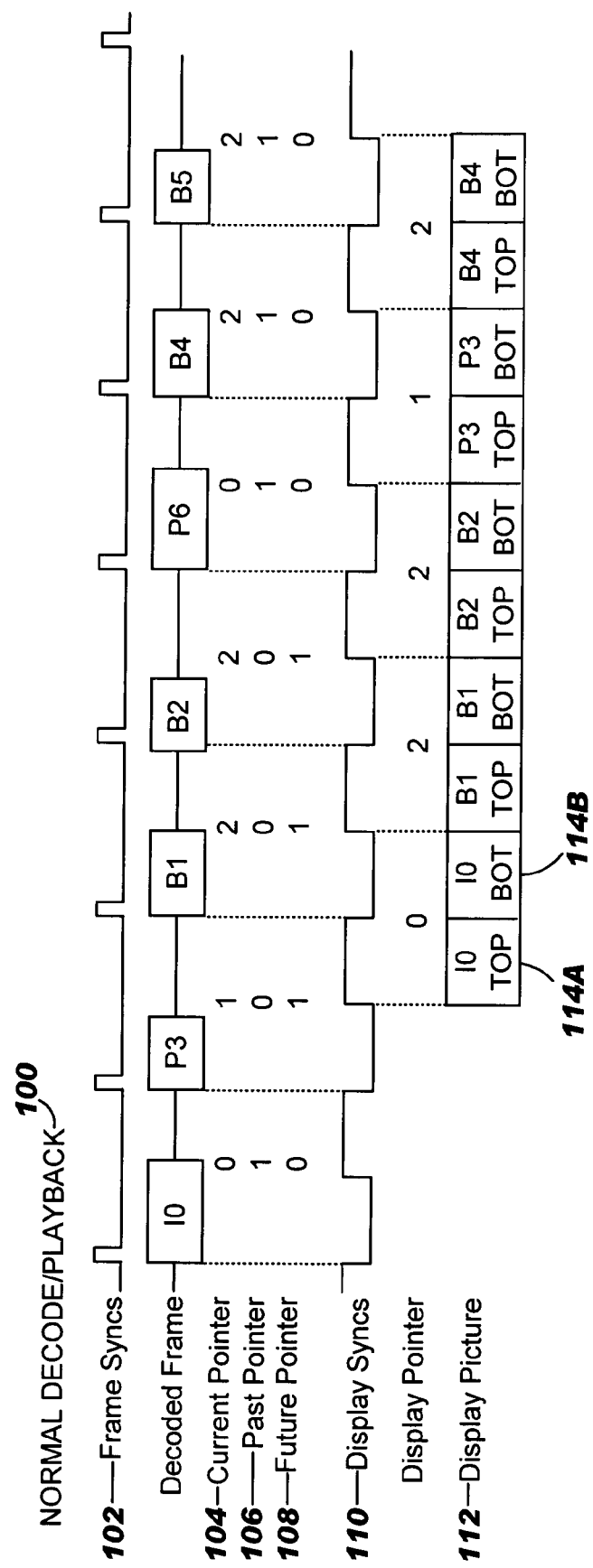
FIG. 5 depicts a flow diagram for normal mode playback, according to the present invention.

Referring now to FIG. 5, flow diagram 100 of a normal mode playback under the system 40 of the present invention is shown. The decoding and display depicted in FIG. 5 is for a video stream having a GOP structure that includes with following frames "IPBBPBB." As indicated above, it should be understood that the order in which frames are decoded can vary from the order in which they are displayed. For example, the GOP structure shown in FIG. 5 will be decoded in the order received, namely "IPBBPBB." However, the frames will be displayed in the order of "IBBPBBP." It is generally known that "P" frames serve as an anchor for a GOP structure when displayed. In addition, as shown, each frame of display picture 112 has two fields. One field 114A is for the odd lines (e.g., 1, 3, 5, 7,etc.) of a frame and a second field 114B is for the even lines (e.g., 2, 4, 6, 8,etc.) of the frame.

In general, normal mode playback is governed by a frame synchronization signal 102. Specifically, one frame is decoded with every "pulse" of frame synchronization signal 102. Typically, each pulse corresponds to a single frame time (e.g., 33 milliseconds). During normal mode playback, a three buffer scheme is typically implemented (e.g., "0 ," "1 ,"

and "2"). Each buffer is typically pointed to by a pointer such as current pointer 104, past pointer 106 and future 108, respectively. The frames are decoded to the buffer being pointed to by current pointer 104. To this extent, the pointers change with successive frames to prevent a frame from being decoded to a particular buffer and overwriting a previously decoded frame that has yet to be read out (e.g., displayed). For example, for frame "I0" the current pointer 104 points to buffer "0." This means that frame "I0" will be decoded to buffer "0." Conversely, for frame "P3," current pointer 104 points to buffer "1," which is where frame "P3" will be decoded.

Past pointer 106 is used to gather information to decode a given frame. For example, as indicated above, a "P" frame requires information from a previously decoded "I" or "P" frame to be decoded. Past pointer 106 points the buffer in which this information can be found. Future pointer 108 points to a buffer where information will be needed to decode a subsequent frame. For example, for frame "P3," the future pointer is pointing to buffer "1." This generally indicates that a frame will be decoded to buffer "1" that will require information from frame "P3." In any event, display synchronization signal 110 will be used by MPEG-2 decoder time the reading of the decoded frames out of the buffers.

As effective as the method of diagram 100 can be for normal playback mode, it is not very useful for trick mode play. Specifically, frame synchronization signal 102 prevents a frame from being decoded at any time faster than a single frame time. Although this may suffice for normal playback, it fails to provide a true fast forward or rewind function. Moreover, because a typical trick mode implementation only decodes "I" frames to a single buffer, poor trick mode playback quality is often present. Under the present invention, trick mode playback is implemented by decoding both "I" and "P" frames of the GOP structure to two (or more) buffers. In addition, to provide faster trick mode playback, frame synchronization signal 102 (FIG. 5) is disengaged by controller microcode. This not only allows decoding to occur at a rate faster than a single frame time, but it also locks the pointers to specific buffers. The controller microcode will then continuously swap the address associated with each pointer to allow the frames to be decoded to the two buffer in an alternating fashion.

Figure 6:
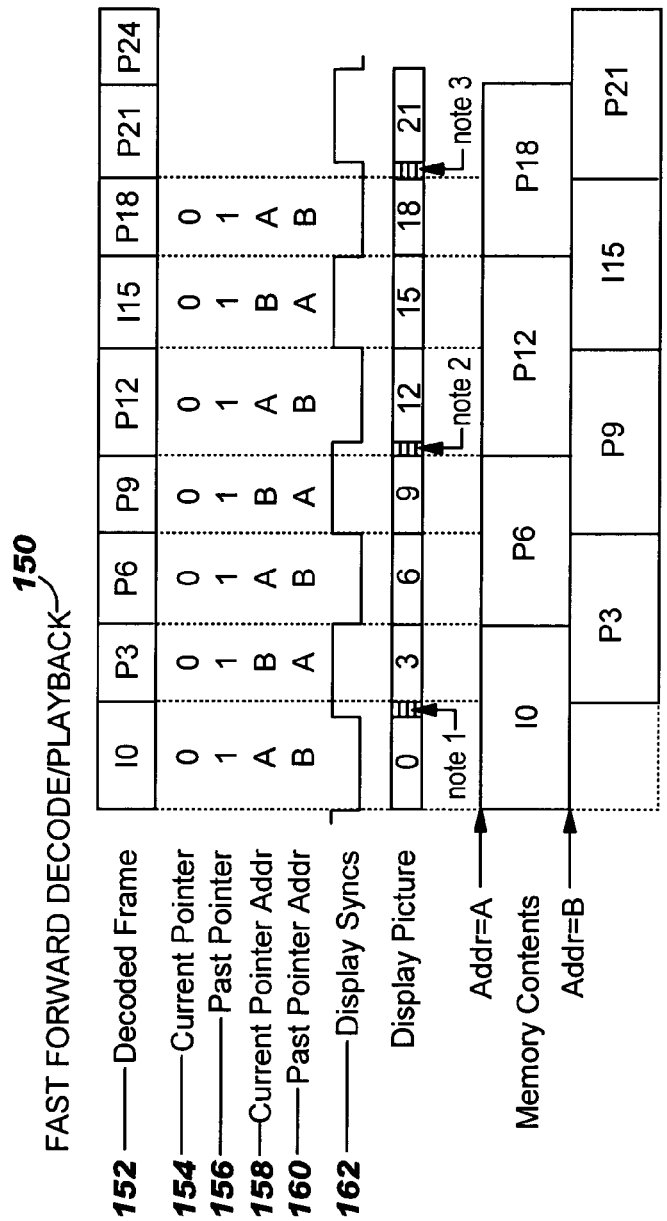
FIG. 6 depicts a flow diagram for providing enhanced trick mode playback, according to the present invention.

Referring now to FIG. 6, flow diagram 150 for providing enhanced trick mode playback according to the present invention is shown in greater detail. As depicted, the frames 152 to be decoded and displayed only include "I" and "P" frames (even though the received video stream/GOP structure includes "I," "P" and "B" frames). The frames are generally decoded to buffers "0" and "1" in an alternating fashion/manner. To this extent, unlike during normal playback mode, current pointer 154 and past pointer 156 are "locked" to particular buffers. For example, as can be seen in FIG. 6, current pointer 154 always points to buffer "0," while past pointer 156 always points to buffer "1." This is typically accomplished by disengagement of the frame synchronization signal by the controller microcode. Once the pointers are locked, the controller microcode will then continuously swap the memory addresses associated with each pointer. Specifically, as shown, current pointer address 158 and past pointer address 160 are continuously swapped (e.g., between "A" and "B") with each successive frame. This allows the (current) buffer to which the frames are decoded to be alternated for each successive frame to prevent any buffer from being overwritten. Accordingly, frames "I0," "P6," "P12," and "P18" will be decoded to buffer "0," while frames "P3," "P9," "I15," and "P21" will be decoded to buffer "1." Thus, the swapping of addresses in this manner creates a ping-pong effect for frame decoding. That is, although the pointers remain locked, the "current buffer" to which each successive frame is decoded will alternate between buffer "0" and buffer "1." Moreover, because the frame synchronization signal is disengaged, the decoding operation can occur at a rate faster than a single frame time per frame.

As the frames are decoded, they will be read out in order from their corresponding buffers according to display synchronization signal 162. So that the proper display order is maintained, the controller microcode will also synchronize the display pointer (not shown) to the current pointer address. That is, similar to the address associated with the current pointer, the address associated with the display pointer will alternate between "A" and "B." Thus, frame "I0" will be read from buffer "0" (memory address "A"), frame "P3" will be read out of buffer "1" (memory address "B"), etc.

Because there may be some overlap or lag in display synchronization signal 162, some noise or tearing may appear such as indicated by notes 1, 2 and 3. However, such distortion will be far less than exhibited by previous trick mode playback schemes. Moreover, all distortion that might exist could be eliminated by decoding "I" and "P" frames in an alternating fashion to three buffers. Similar to a two buffer scheme, a three buffer scheme would include two pointers locked to particular buffers. However, three different addresses associated with the pointers would be continuously swapped. For example, the current pointer and past pointer would rotate between addresses "A," "B" and "C.". The third buffer in this scenario would likely be the display buffer. This concept could be further expanded to an "N" buffer scheme to decode and store reference frames on a GOP basis in reverse order (e.g., GOPt, GOPt-1, GOPt-2, etc.). In this scenario, the display point would track back through the GOP structures.

Figure 7:
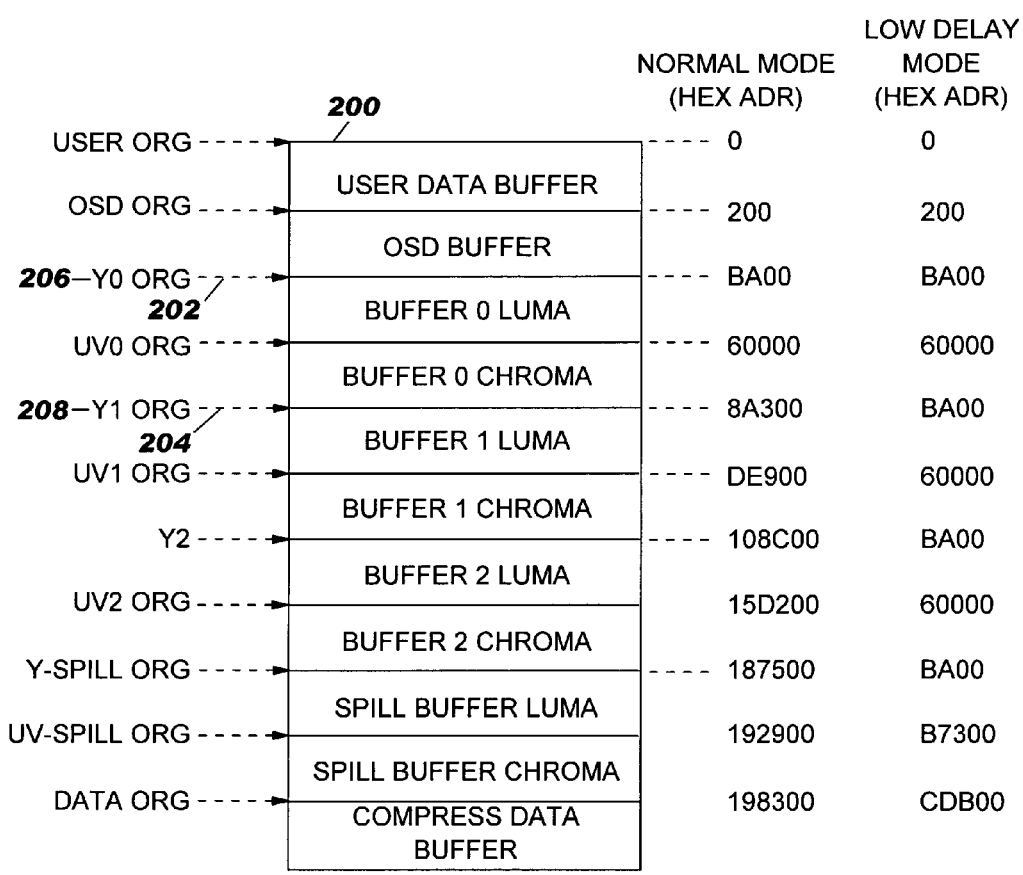
FIG. 7 depicts a buffer array that will be manipulated for providing enhanced trick mode playback, according to the present invention.

Referring to FIG. 7, an illustrative buffer scheme 200 is shown. Buffer scheme 200 is representative of that which could be implemented in an MPEG-2 standard compliant decoder. As shown, several buffers are present. Each buffer has a pointer that is associated with a memory/origin address. Under a typical previous trick mode playback scheme, only one buffer was used, and only "I" frames were decoded. However, under trick mode playback according to the present invention, two buffers would be used, and both "I" and "P" frames within the GOP structure would be decoded. For example, assume that during trick mode playback according to the present invention, buffers "0 Luma" and "1 Luma" were utilized. Under the present invention, the frame synchronization signal would be disengaged to lock pointers 202 and 204 thereto, respectively. Once locked, the controller microcode would continuously swap origin/memory addresses 206 and 208 associated with pointers 202 and 204. This would cause the "I" and "P" frames to be decoded to buffers "0 Luma" and "1 Luma" in an alternating or ping-pong fashion/manner. In addition, because the controller microcode will synchronize the display pointer to the current pointer address, the address associated with the display pointer will also by continuously swapped. This allows the frames to be read out of the buffers in the proper order (e.g., the order in which they were decoded during trick mode playback).

It should be understood that in the illustrative embodiment described above, the GOP structure included both "I" and "P" frames that were decoded in a ping-pong fashion to two or more buffers. However, this need not be the case. For example, it is known that a GOP structure could include only "I" frames or "I" and "B" frames. In this case, only "I" frames would be decoded to the multiple buffers in an alternating/ping-pong fashion. Accordingly, a GOP structure decoded under the present invention will include at least one "I" frame and at least zero "P" frames.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims. For example, the trick mode playback described herein according to the present invention is typically used for fast forward playback of a video stream. However, similar teachings could be implemented for rewind playback of the video stream. In this case, it is likely that three or more buffers would be utilized for optimal quality.

We claim:

1. An MPEG-2 video decoding method for providing enhanced trick mode playback of a video stream, comprising:
    providing a first buffer and a second buffer within an MPEG-2 decoder, wherein the first buffer has a first pointer that is associated with a first address, and wherein the second buffer has a second pointer that is associated with a second address;
    locking the first pointer and the second pointer in place by disengaging a frame synchronization signal within the MPEG-2 decoder; and
    decoding, in a single traversal through a set of frames, the set of frames of the video stream for trick mode playback to the first buffer and the second buffer in a strictly alternating fashion by continuously swapping the first address and the second address on a frame by frame basis such that every frame in the first buffer is immediately followed by a frame in the second buffer and every frame in the second buffer is immediately followed by a frame in the first buffer until an end of the video stream.

2. The method of claim 1, wherein disengaging the frame synchronization signal allows the set of frames to be decoded at a rate faster than a single frame time.

3. The method of claim 1, further comprising:
    synchronizing a display pointer within the MPEG-2 decoder with the first address; and
    reading the decoded set of frames out of the first buffer and the second buffer in the alternating fashion based on the display pointer.

4. The method of claim 1, wherein the first buffer is a current buffer and the second buffer is a past buffer.

5. The method of claim 1, wherein the first address and the second address are continuously swapped by microcode within the MPEG-2 decoder.

6. The method of claim 1, wherein the set of frames comprises at least one I frame and at least zero P frames.

7. The method of claim 1, wherein the MPEG-2 decoder further comprises a third buffer, and wherein the set of frames are decoded to the first buffer, the second buffer and the third buffer in the alternating fashion by continuously swapping the first address, the second address and a third address.

8. An MPEG-2 decoder for providing enhanced trick mode playback of a video stream, comprising:
    at least one computer device, having:
    a first buffer and a second buffer, wherein the first buffer has a first pointer that is associated with a first address, and wherein the second buffer has a second pointer that is associated with a second address; and
    microcode for locking first pointer and the second pointer in place by disengaging a frame synchronization signal within the MPEG-2 decoder, and for continuously swapping the first address and the second address on a frame by frame basis so that a set of frames of the video stream comprising at least one I frame and at least zero P frames can be decoded, in a single traversal through a set of frames, without use of B frames for trick mode playback to the first buffer and the second buffer in a strictly alternating fashion such that every frame in the first buffer is immediately followed by a frame in the second buffer and every frame in the second buffer is immediately followed by a frame in the first buffer until an end of the video stream.

9. The MPEG-2 decoder of claim 8, wherein disengagement of the frame synchronization signal allows the set of frames to be decoded at a rate faster than a single frame time.

10. The MPEG-2 decoder of claim 8, wherein a display pointer within the MPEG-2 decoder is synchronized with the first address, and wherein the decoded set of frames is read out of the first buffer and the second buffer in the alternating fashion based on the display pointer.

11. The MPEG-2 decoder of claim 8, wherein the first buffer is a current buffer and the second buffer is a past buffer.

12. The MPEG-2 decoder of claim 8, wherein the set of frames are part of a group of pictures with a set of B frames.

13. The MPEG-2 decoder of claim 8, wherein the MPEG-2 decoder further comprises a third buffer, and wherein the set of frames are decoded to the first buffer, the second buffer and the third buffer in the alternating fashion by continuously swapping the first address, the second address and a third address.

14. A computer device having an MPEG-2 buffer scheme for providing enhanced trick mode playback of a video stream, comprising:
    a first buffer having a first pointer that is associated with a first address; and
    a second buffer having a second pointer that is associated with a second address, wherein the first pointer is locked to the first buffer and the second pointer is locked to the second buffer, and wherein a set of frames of the video stream comprising at least one I frame and at least zero P frames is decoded for trick mode playback in a single traversal through a set of frames without use of B frames to the first buffer and the second buffer in a strictly alternating fashion based on a continuous swapping of the first address and the second address on a frame by frame basis such that every frame in the first buffer is immediately followed by a frame in the second buffer and every frame in the second buffer is immediately followed by a frame in the first buffer until an end of the video stream.

15. The MPEG-2 buffer scheme of claim 14, wherein the first pointer and the second pointer are locked in place based on a disengagement of a frame synchronization signal.

16. The MPEG-2 buffer scheme of claim 15, wherein the disengagement of the frame synchronization signal allows the set of frames to be decoded at a rate faster than a single frame time.

17. The MPEG-2 buffer scheme of claim 14, further comprising microcode for continuously swapping the first address and the second address.

18. The MPEG-2 buffer scheme of claim 14, further comprising a display pointer, wherein the display pointer is synchronized with the first address, and wherein the decoded set of frames is read out of the first buffer and the second buffer in the alternating fashion based on the display pointer.

19. The MPEG-2 buffer scheme of claim 14, wherein the first buffer is a current buffer and the second buffer is a past buffer.

20. The MPEG-2 buffer scheme of claim 14, wherein the set of frames are part of a group of pictures with a set of B frames.

21. The MPEG-2 buffer scheme of claim 14, further comprising a third buffer, wherein the set of frames are decoded to the first buffer, the second buffer and the third buffer in the alternating fashion based on a continuous swapping of the first address, the second address and a third address.

* * * * *